United States Patent [19]

Janetzke et al.

[11] Patent Number: 4,580,445

[45] Date of Patent: Apr. 8, 1986

[54] METHOD AND APPARATUS FOR DETERMINING THE INFLUENCE OF DIFFERENT CONTROL QUANTITIES ON THE MEASURED VALUES OF THE ROTATIONAL SPEED OF AN INTERNAL COMBUSTION ENGINE

[75] Inventors: Helmut Janetzke; Helmut Kauff, both of Schwieberdingen; Alfred Schulz, Oberriexingen, all of Fed. Rep. of Germany

[73] Assignee: Robert Bosch GmbH, Stuttgart, Fed. Rep. of Germany

[21] Appl. No.: 697,004

[22] Filed: Jan. 31, 1985

[30] Foreign Application Priority Data

Feb. 1, 1984 [DE] Fed. Rep. of Germany ....... 3403358

[51] Int. Cl.$^4$ .......................................... G01M 15/00
[52] U.S. Cl. ...................................... 73/116; 123/436
[58] Field of Search .................. 73/116, 118; 324/161; 123/436, 480, 478

[56] References Cited

U.S. PATENT DOCUMENTS 4,509,484  4/1985  Gertiser ........................... 73/116 X
4,517,831  5/1985  Hirano ............................... 73/116

Primary Examiner—Jerry W. Myracle
Attorney, Agent, or Firm—Walter Ottesen

[57] ABSTRACT

The invention is directed to a method and an apparatus of determining whether the rotational speed of an internal combustion engine is attributable to a corresponding correcting quantity signal from an idle air charge control or whether an overrun condition exists. For this purpose, a variable supplementary signal is superposed on the correcting quantity signal of the idle air charge control. The mean value of this supplementary signal may be preferably zero. Taking the dead time of the internal combustion engine into account, the measured rotational speeds are correlated with the changes in the previously issued correcting quantity signals, and it is determined whether the engine is in the overrun mode of operation or idling. If an overrun condition is detected, an overrun recognition signal may be issued to initiate measures aimed at preventing the internal combustion engine from stalling, for example.

7 Claims, 1 Drawing Figure

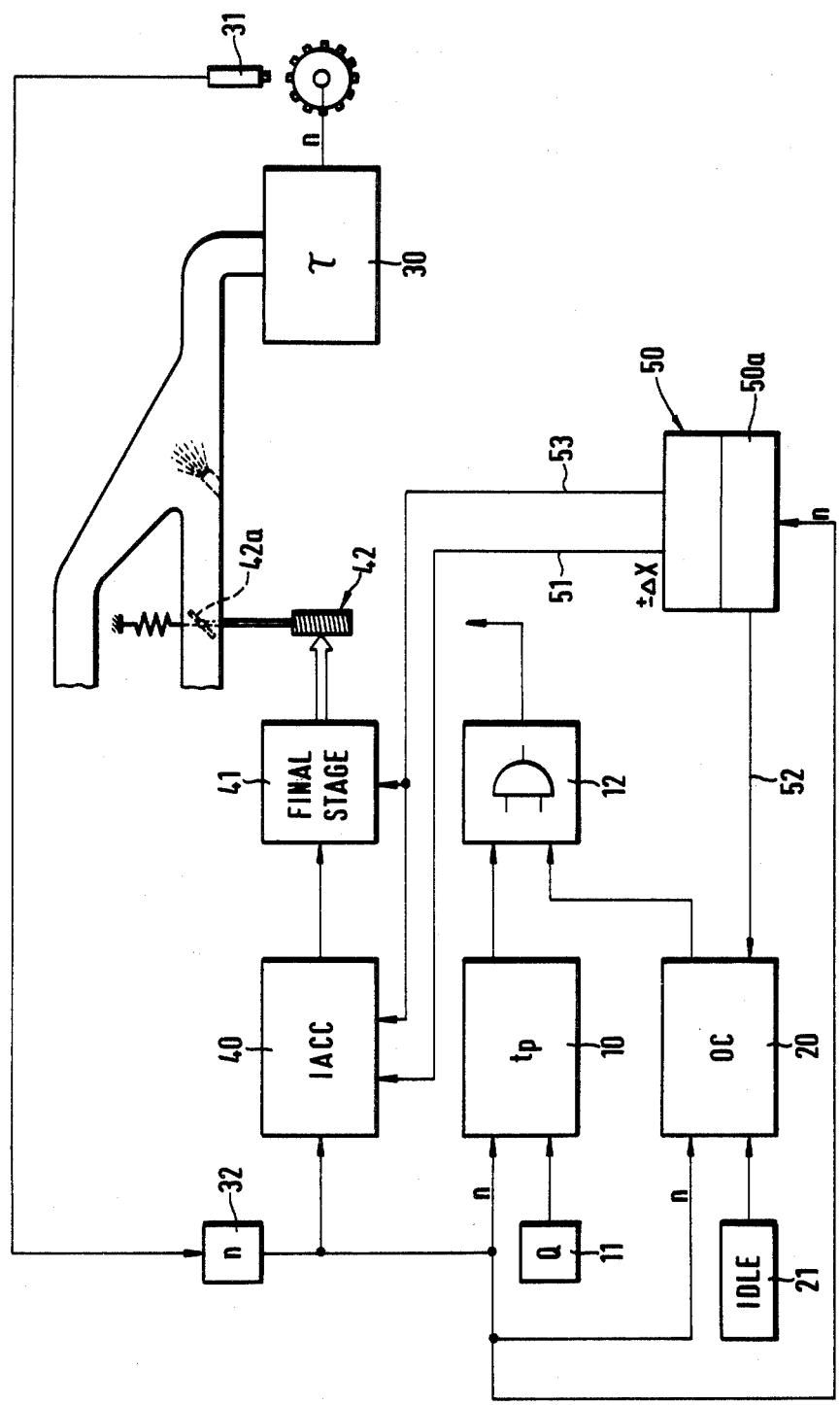

METHOD AND APPARATUS FOR DETERMINING THE INFLUENCE OF DIFFERENT CONTROL QUANTITIES ON THE MEASURED VALUES OF THE ROTATIONAL SPEED OF AN INTERNAL COMBUSTION ENGINE

FIELD OF THE INVENTION

The invention relates to a method and apparatus for determining the influence of a given rotational speed closed-loop control system or a rotational speed regulating system on the measured values of the rotational speed of an internal combustion engine.

BACKGROUND OF THE INVENTION

Arrangements for controlling the rotational speed of internal combustion engines are known; thus, for example, it is customary to provide an idle air charge control (IACC) adapted to act upon an air bypass arranged parallel to the throttle valve of the internal combustion engine. The action upon the air bypass conventionally is done with the aid of a two-winding rotational controller. Considering the instantaneous actual speed of the internal combustion engine, a desired speed and other peripheral data, such an idle air charge control (when executed pursuant to analog or digital technology) is under most operating conditions in a position to maintain a perfect idling condition of the internal combustion engine. Problems occur in the transition phase from the overrun mode of operation to idling or from the driving mode of operation to idling.

On the other hand, it is known in the operation of internal combustion engines to interrupt the supply of fuel if the throttle valve is closed at higher and high engine speeds, that is, if the internal combustion engine is in the overrun mode of operation. Such an overrun condition exists also if the rotational speed of an internal combustion engine is higher than corresponds to the position of the throttle valve in a spark-ignition engine or to the quantity of fuel injected in a diesel engine, for example. If the internal combustion engine is in the overrun mode of operation, no output is desired. Therefore, fuel delivery to the internal combustion engine through the relevant fuel supply apparatus (carburetor, injection systems, or the like) is conventionally reduced or interrupted entirely (overrun cutoff OC).

If an internal combustion engine runs at a rotational speed above idling speed, it can be of decisive importance that the system controlling the operating condition of the internal combustion as a whole, that is, fuel supply apparatus such as carburetor, fuel injection system, or the like, as well as other peripheral subsystems, also for ignition systems, and the like, is provided with information as to whether this rotational speed is attributable to overrunning.

At rotational speeds above idling, it may even happen that an overrun cutoff function is activated as an independent subsystem for idle air charge control, resulting in an undesired shutoff of the fuel supply, so that in the extreme case the engine may even stall. Critical operating conditions in the overrun mode of operation occur when the clutch is disengaged or when a vehicle equipped with automatic transmission is decelerated because in these cases the internal combustion engine is no longer entrained by the vehicle moved along or driven by other means (downhill driving). In such a case, the speed may drop so abruptly that the idle air charge control is unable to intercept it in time.

Whether or not the internal combustion engine is in the overrun mode of operation cannot be determined by the rotational speed and throttle flap position sensors alone. However, a distinction is desired, for example, to initiate appropriate measures on detection of an overrun condition to prevent the internal combustion engine from stalling or the overrun cutoff functions from being enabled in the presence of an increased idling speed which is attributable to the idle air charge control.

SUMMARY OF THE INVENTION

Therefore, it is an object of the invention to determine whether an internal combustion engine is in the overrun mode of operation.

The method of the invention determines the influence of given rotational-speed closed-loop and rotational-speed open-loop control systems on the measured values of the rotational speed of an internal combustion engine. The method includes the steps of: superposing a changeable supplementary signal ($\Delta X$) upon a control quantity signal for effecting a change of the latter; correlating the change with the actual rotational speed (n) of the internal combustion engine and deciding if the internal combustion engine is in the overrun mode of operation.

The invention achieves the above-mentioned object and affords the advantage of permitting a reliable distinction to be made between the presence of an overrun mode of operation and an idling condition of the internal combustion engine, without the need to provide additional external sensors or means for detecting operating conditions. It is another advantage herein that the existing systems and subsystems need not be subject to major interventions.

The invention is based on the realization that, in the absence of an overrun condition, the internal combustion engine responds sensitively to correcting quantities; whereas, in the overrun mode of operation, the course of the rotational speed over time is substantially independent of any changes, including those intentionally generated in the system; the point is that the overrunning speed does not depend on the quantity of fuel supplied; instead, the overrunning speed results from external conditions of the motor vehicle equipped with this particular internal combustion engine.

The invention permits the generation of a suitable signal when, for example, an overrun condition is detected; as a result, appropriate peripheral measures may be initiated to ensure, for example, that the internal combustion engine does not stall in the transition from the overrun condition.

Particularly advantageous is the inclusion of the dead time, which is inherent in the construction of the internal combustion engine, in the change in the correcting quantity of the idle air charge range, because corresponding changes in the correcting quantity have a particular effect after the dead time.

BRIEF DESCRIPTION OF THE DRAWING

The invention will now be described in more detail with reference to the drawing showing an embodiment of the invention. The drawing is in the form of a block diagram and shows the apparatus according to the invention in combination with several fundamental control systems for the operation of an internal combustion engine and their relevant interaction.

DESCRIPTION OF THE PREFERRED EMBODIMENTS OF THE INVENTION

First it is to be noted that the block diagram of the drawing is illustrated in this discrete form merely for the purpose of a better understanding; it is to be understood that the individual components and blocks may be constructed applying analog, digital or hybrid technology or, wholly or partly combined, may cover corresponding areas of program-controlled microprocessors or the like. Important for the understanding and the scope of the invention are only the effect accomplished by the relevant blocks referred to and the interaction of the individual components. Therefore, the invention is not restricted to the embodiment shown, not even in a wider sense.

In the drawing, the main system for maintaining proper operation of an internal combustion engine, that is, the fuel supply apparatus which may be a carburetor, a fuel injection system or the like, is shown by a pre-stage 10 conventionally including at least one timing element and by an additional input block 11. The pre-stage is conventionally referred to as a control multivibrator stage and generates pre-pulses on the basis of the main signals delivered to it; these main signals may be indicative of induced or supplied air quantity or air mass and of the rotational speed of the internal combustion engine. Related to a fuel injection apparatus, but not meant to be limited thereto, these pre-pulses $t_p$ may also be applied to a subsequent multiplier stage which generates the usual fuel injection pulses $t_i$ to be routed to final control elements configured as electromagnetically operated injection valves.

The multiplier stage is not shown in the drawing; pre-stage 10 is followed by a combining stage 12 which, in the embodiment shown, serves the primary purpose of preventing the further transmission of the pre-pulses $t_p$ to the subsequent stages; this is accomplished by means of a cutoff signal stemming from an overrun cutoff (OC) stage 20; as a result, fuel supply to the internal combustion engine generally identified by reference numeral 30 is interrupted entirely.

Overrun cutoff stage 20 will issue such an overrun cutoff instruction whenever it determines the presence of an overrun condition of the internal combustion engine 30 from an idle position signal it receives from an input block 21 (throttle valve closed) and from a rotational speed signal n.

Rotational speed signal n is produced by a transducer 31 scanning, for example, a toothed gear wheel of the internal combustion engine (also the starter toothed gear wheel can be utilized which is driven in synchronism with the rotational speed of the engine. The rotational speed signal n is routed to a speed signal processing or forming stage 32. From speed-signal processing stage 32, rotational speed signal n is also applied to block 40 of the idle air charge control which utilizes this and some further information (desired idling speed, engine temperature, atmospheric pressure, and the like) to compute a correcting quantity signal and activates, via a subsequent final stage 41, a two-winding controller 42 conventionally used in the currently preferred systems. In the control of the idle air charge, this controller 42 actuates a slide gate 42a mounted in an air bypass arranged parallel to the throttle valve (not shown). The slide gate 42a has a position determining a desired cross-sectional area of pass-through aperture. The position results from the type of the correcting quantity signal of the idle air charge control (analog signal or extent of activation by the clock pulse sequence indicating its pulse duty factor). This results in a corresponding idling speed of internal combustion engine 30, it being understood that the idling speed actually attained in the individual case is also a function of the engine dead time $\tau$, because the internal combustion engine needs a certain amount of time to convert the changed rate of air flow resulting from a changed slide gate position into a correspondingly changed rotational speed.

According to an essential feature of the invention, the existence of an overrun condition is determined by superposing a variable supplementary signal on the correcting quantity signal generated by idle air charge control 40. The supplementary signal is produced by a circuit block 50 and is routed as signal $\pm\Delta X$ to idle air charge control 40 via a connecting line 51. Of course, it is also possible to apply this supplementary signal to final stage 41 of idle air charge control or directly to two-winding controller 42. In this arrangement, it is to be understood that the two signals, that is, the correcting signal from the idle air charge control and the variable supplementary signal, have to be coordinated such that, when viewed over time, more or less appreciable changes in the position of the slide gate result, whereupon the internal combustion engine 30 will respond by rotational speed changes when its rotational speed is actually determined by the idle air charge control.

The supplementary signal superposed on the correcting quantity signal may in its mean value also correspond to zero, that is, it may be a periodic cycle, although a rising and falling signal which modifies the correcting quantity signal in only one direction may be evaluated in the same manner. In view of the dead time referred to above which is inherent in the construction of an internal combustion engine (for example, a spark-ignition engine), a change in the correcting quantity signal has a particular impact after this dead time $\tau$, provided, however that the (higher) idling speed is attributable to an activation by idle air charge control 40. By contrast, if the internal combustion engine is in the overrun mode of operation, such correcting quantity signal changes have no or only extremely little effect.

The invention comprises a separate correlation circuit component 50a to which the rotational speed signal n is applied. This circuit component 50a is suitably integrated into block 50 which may also be a microcomputer or microprocessor or computer, for example. Since the correlation circuit component 50a also receives an information on the variable supplementary signal $\Delta X$, it can correlate the measured rotational speeds with the previously issued correcting quantity signal changes. Correlation circuit component 50a may also be configured such that a speed-dependent dead time is taken into consideration when storing and evaluating the correlation. The correcting quantity signal change caused by the supplementary signal may be chosen as small as possible so that a corresponding rotational speed change is just still detectable. Because in the overrun mode of operation the rotational speed will not react on the supplementary signal change, correlation circuit component 50a can detect an overrun condition.

The correlation circuit component 50a may be configured as an analog component or a digital component depending on the type of signals to be processed. Thus, in the case of analog signals, component 50a may include comparators generating an output signal in the presence of an overrun condition, that is, if no correlation of the measured rotational speeds with the issued correcting quantity changes is present. Such an overrun recognition signal may be effectively evaluated and may be routed to overrun cutoff stage 20 and/or idle air charge control 40 or its final stage 41 via output lines 52 and 53, for example. The overrun recognition signal can, for example, prevent the overrun cutoff stage 20 from reacting by interrupting the supply of fuel, in spite of a rotational speed in the range above the cutoff speed of the overrun cutoff function, or, by activation of the range of idle air charge control, it may cause the air bypass aperture to widen, or to provide for the generation of such signals immediately on the determination of corresponding drops in the rotational speed; therefore, the overrun recognition signal is suitable for preparing or initiating promptly effective interception measures.

It is understood that the foregoing description is that of the preferred embodiments of the invention and that various changes and modifications may be made thereto without departing from the spirit and scope of the invention as defined in the appended claims.

What is claimed is:

1. Method for determining the influence of given rotational-speed closed-loop and rotational-speed open-loop control systems on the measured values of rotational speed of an internal combustion engine, the method comprising the steps of:

superposing a changeable supplementary signal ($\Delta X$) upon a control quantity signal for effecting a change of the latter;

correlating said change with the actual rotational speed (n) of the internal combustion engine and deciding if said internal combustion engine is in the overrun mode of operation.

2. The method of claim 1, wherein the dead time ($\tau$) of the internal combustion engine is utilized in effecting said change and in the correlation of said change with the actual rotational speed.

3. The method of claim 2, wherein the mean value of said change of said supplementary signal ($\Delta X$) is zero.

4. Apparatus for determining the influence of given rotational-speed closed-loop and rotational-speed open-loop control systems on the measured values of the rotational speed of an internal combustion engine, the apparatus comprising:

idle air charge control means for computing and generating a correcting quantity signal; and, an arrangement for generating a changeable supplementary signal ($\Delta X$) for superposing the same on said correcting quantity signal, the arrangement including:

sensor means for measuring said values of the rotational speed of the engine; and, correlation circuit means for placing said supplementary signal and said measured values of rotational speed into a time relationship which considers the dead time ($\tau$) of the engine and for generating an overrun recognition signal only in response to substantially unchanging non-correlative measured values of rotational speed.

5. The apparatus of claim 4, the internal combustion engine having an air bypass arranged parallel to the throttle valve, said idle air charge control means including actuator means for adjusting the area of the pass-through cross-section of said bypass; the apparatus further comprising overrun cutoff circuit means for receiving said overrun recognition signal as a blocking signal; and, said idle air charge control means being connected to said correlation circuit means to likewise receive said overrun recognition signal for additionally controlling said actuator.

6. The apparatus of claim 4, comprising overrun cutoff circuit means for receiving said overrun recognition signal as a blocking signal.

7. The apparatus of claim 4, the internal combustion engine having an air bypass arranged parallel to the throttle valve, said idle air charge control means including actuator means for adjusting the area of the pass-through cross-section of said bypass; said idle air charge control means being connected to said correlation circuit means to receive said overrun recognition signal for additionally controlling said actuator.

* * * * *